(12) United States Patent
Huang-Fu

(10) Patent No.: US 11,206,597 B2
(45) Date of Patent: Dec. 21, 2021

(54) ENHANCED UE ROUTE SELECTION POLICY (URSP) RULES SELECTION

(71) Applicant: MEDIATEK INC., Hsinchu (TW)

(72) Inventor: Chien-Chun Huang-Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/867,769

(22) Filed: May 6, 2020

(65) Prior Publication Data

US 2020/0359295 A1 Nov. 12, 2020

Related U.S. Application Data

(60) Provisional application No. 62/843,640, filed on May 6, 2019.

(51) Int. Cl.
*H04W 4/00* (2018.01)
*H04W 40/12* (2009.01)
(Continued)

(52) U.S. Cl.
CPC ........... *H04W 40/12* (2013.01); *H04W 48/18* (2013.01); *H04W 80/10* (2013.01)

(58) Field of Classification Search
USPC ................................ 370/328, 329, 330, 331
See application file for complete search history.

(56) References Cited

U.S. PATENT DOCUMENTS

| | | |
|---|---|---|
| 2010/0008367 A1 | 1/2010 | Wan Ackere et al. |
| 2018/0220290 A1 | 8/2018 | Sivavakeesar |

(Continued)

FOREIGN PATENT DOCUMENTS

| | | |
|---|---|---|
| CN | 109286567 A | 1/2019 |
| WO | WO 2017/029795 A1 | 2/2017 |

(Continued)

OTHER PUBLICATIONS

English translation of the International Search Report and Written Opinion of the International Searching Authority dated Aug. 7, 2020 in PCT/CN2020/088789, 9 pages.

(Continued)

*Primary Examiner* — David Q Nguyen
(74) *Attorney, Agent, or Firm* — Oblon, McClelland, Maier & Neustadt, L.L.P.

(57) ABSTRACT

Aspects of the disclosure provide apparatuses and methods for wireless communications. One apparatus includes processing circuitry that selects a non-default and unevaluated URSP rule as an evaluating URSP rule. The URSP rule includes a traffic descriptor matching an application triggered by the apparatus. The processing circuitry selects a first unevaluated RSD of the evaluating URSP rule as an evaluating RSD, and determines whether the evaluating RSD includes at least one of a non-supported PDU session type, a non-supported SSC mode, and a non-supported S-NSSAI. When the evaluating RSD is determined to include at least one of the non-supported PDU session type, the non-supported SSC mode, and the non-supported S-NSSAI, the processing circuitry determines whether the evaluating URSP rule includes a second unevaluated RSD. The processing circuitry selects the second unevaluated RSD as the evaluating RSD when the evaluating URSP rule is determined to include the second unevaluated RSD.

20 Claims, 5 Drawing Sheets

(51) Int. Cl.
   *H04W 80/10*     (2009.01)
   *H04W 48/18*     (2009.01)

(56) References Cited

U.S. PATENT DOCUMENTS

| | | | |
|---|---|---|---|
| 2019/0268835 A1* | 8/2019 | Shan | H04W 48/08 |
| 2020/0304983 A1* | 9/2020 | Zhu | H04W 36/00 |
| 2021/0067949 A1* | 3/2021 | Xu | H04W 76/11 |
| 2021/0211938 A1* | 7/2021 | Shen | H04W 40/34 |
| 2021/0243664 A1* | 8/2021 | Huang-Fu | H04W 76/22 |

FOREIGN PATENT DOCUMENTS

| | | |
|---|---|---|
| WO | WO 2018/208371 A1 | 11/2018 |
| WO | WO 2019/034291 A1 | 2/2019 |

OTHER PUBLICATIONS

"3GPP 3rd Generation Partnership Project; Technical Specification Group Services and System Aspects; Policy and Charging Control Framework for the 5G System; Stage 2 (Release 15)" 3GPP TS 23.503 V1.0.0, Dec. 31, 2017, 59 pages.

"Discussion on the Scope of TS 24.568" Nokia, Nokia Shanghai Bell, 3GPP TSG-CT WG1 Meeting #110 C1-182320, Apr. 20, 2018, 4 pages.

Combined Taiwanese Office Action and Search Report dated Mar. 10, 2021 in corresponding Taiwanese Patent Application No. 109115034 (with English Translation of Category of Cited Documents), 9 pages.

\* cited by examiner

ENHANCED UE ROUTE SELECTION POLICY (URSP) RULES SELECTION

INCORPORATION BY REFERENCE

This present application claims the benefits of U.S. Provisional Application No. 62/843,640, "Enhanced URSP Rules selection" filed on May 6, 2019, which is hereby incorporated by reference in its entirety.

TECHNICAL FIELD

The present disclosure relates generally to wireless communications, and specifically relates to UE route selection policy (URSP) rules selection in 5G new radio (NR) system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In wireless system, a user equipment (UE), such as a cellular smartphone, may need to trigger an application, such as a browser or an email client. The UE can determine how to outgoing traffic associated with the application according to UE route selection policy (URSP). The URSP can be delivered via an access and mobility management function (AMF) from a policy control function (PCF) to the UE. According to the URSP, the traffic can be routed to an established protocol data unit (PDU) session, can be offloaded to a non-3GPP access outside a PDU session, or can trigger an establishment of a new PDU session.

SUMMARY

Aspects of the disclosure provide an apparatus for wireless communications. The apparatus includes processing circuitry that can select a first non-default and unevaluated UE route selection policy (URSP) rule as an evaluating URSP rule based on the first non-default and unevaluated URSP rule including a first traffic descriptor that matches application information of an application that is triggered by the apparatus. The processing circuitry selects a first unevaluated route selection descriptor (RSD) of the evaluating URSP rule as an evaluating RSD. The processing circuitry determines whether the evaluating RSD includes at least one of a non-supported protocol data unit (PDU) session type, a non-supported session and service continuity (SSC) mode, and a non-supported single network slice selection assistance information (S-NSSAI). When the evaluating RSD is determined to include at least one of the non-supported PDU session type, the non-supported SSC mode, and the non-supported S-NSSAI, the processing circuitry determines whether the evaluating URSP rule includes a second unevaluated RSD. The processing circuitry selects the second unevaluated RSD as the evaluating RSD when the evaluating URSP rule is determined to include the second unevaluated RSD.

According to aspects of the disclosure, when the evaluating URSP rule is determined not to include the second unevaluated RSD, the processing circuitry determines whether the UE is configured with a second non-default and unevaluated URSP rule that includes a second traffic descriptor matching the application information of the triggered application.

In an embodiment, when the UE is determined to be configured with the second non-default and unevaluated URSP rule that includes the second traffic descriptor matching the application information of the triggered application, the processing circuitry selects the second non-default and unevaluated URSP rule as the evaluating URSP rule.

Alternatively, when the UE is determined not to be configured with the second non-default and unevaluated URSP rule that includes the second traffic descriptor matching the application information of the triggered application, the processing circuitry can report a failure of an association of the triggered application to one of a PDU session and a non-seamless non-3GPP offload access. In addition, the processing circuitry can determine whether a local configuration of the UE is available for the triggered application. When the local configuration of the UE is determined to be available for the triggered application, the processing circuitry performs an association of the triggered application to a PDU session based on the local configuration of the UE.

In another embodiment, the first non-default and unevaluated URSP rule can be selected based on a URSP rule precedence value of the first non-default and unevaluated URSP rule. The first unevaluated RSD is selected based on a RSD precedence value of the first unevaluated RSD.

According to aspects of the disclosure, before selecting the first unevaluated RSD of the evaluating URSP rule as the evaluating RSD to establish a PDU session, the processing circuitry determines whether the UE is configured with an existing PDU session matching at least one RSD of the evaluating URSP rule.

In an embodiment, when the UE is determined to be configured with the existing PDU session matching at least one RSD of the evaluating URSP rule, the processing circuitry provides information on the existing PDU session. Alternatively, when the UE is determined not to be configured with the existing PDU session matching at least one RSD of the evaluating URSP rule, the processing circuitry selects the first unevaluated RSD of the evaluating URSP rule.

The processing circuitry can determine whether the evaluating RSD includes a non-seamless non-3GPP offload indication. When the evaluating RSD is determined not to include the non-seamless non-3GPP offload indication, the processing circuitry can establish a new PDU session. Further, the processing circuitry can establish a new PDU session when the evaluating RSD is determined not to include at least one of the non-supported PDU session type, the non-supported SSC mode, and the non-supported S-NSSAI.

In an embodiment, the processing circuitry performs an association of the triggered application to one of a PDU session and a non-seamless non-3GPP offload access. When the association is not successful, the processing circuitry reports a failure of the association.

Aspects of the disclosure provide a method for wireless communications. Under the method, a first non-default and unevaluated URSP rule is selected as an evaluating URSP rule based on the first non-default and unevaluated URSP rule including a first traffic descriptor that matches application information of a triggered application. A first unevaluated route selection descriptor (RSD) of the evaluating URSP rule is selected as an evaluating RSD. It is determined whether the evaluating RSD includes at least one of a non-supported PDU session type, a non-supported SSC mode, and a non-supported S-NSSAI. When the evaluating RSD is determined to include at least one of the non-supported PDU session type, the non-supported SSC mode, and the non-supported S-NSSAI, it is determined whether the evaluating URSP rule includes a second unevaluated RSD. The second unevaluated RSD is selected as the evaluating RSD when the evaluating URSP rule is determined to include the second unevaluated RSD.

Aspects of the disclosure further provide a non-transitory computer-readable medium which stores instructions implementing any one or a combination of the above methods for wireless communication.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
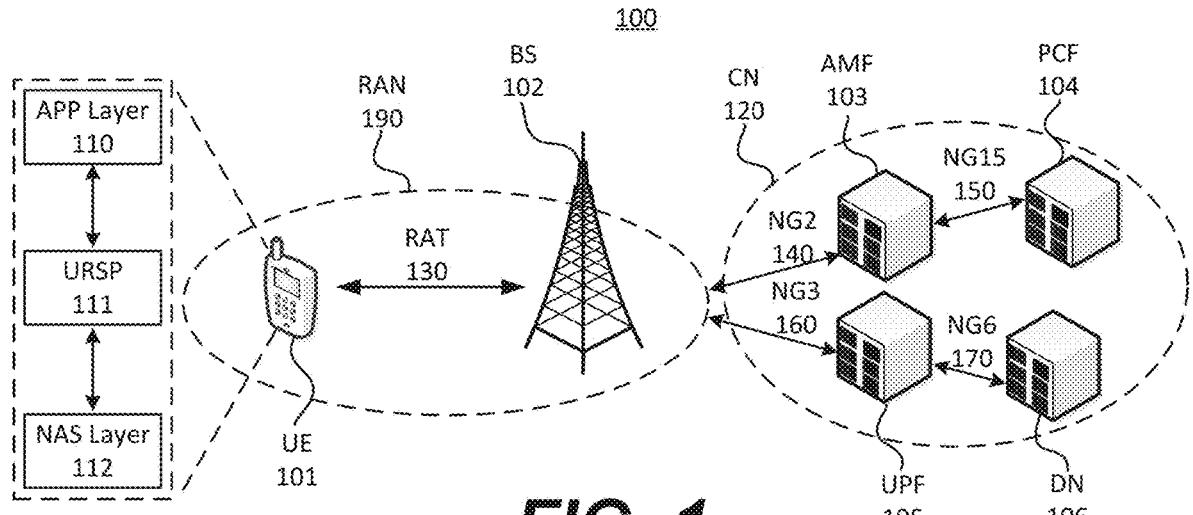
FIG. 1 shows an exemplary wireless communication system performing dual connectivity operations according to an embodiment of the disclosure.

FIG. 1 shows an exemplary wireless communication system 100 supporting enhanced user equipment (UE) route selection policy (URSP) rules selection according to an embodiment of the disclosure. The wireless communication system 100 can be a 5G new radio (NR) network including a UE 101, a base station (BS) 102, an access and mobility management function (AMF) 103, a policy control function (PCF) 104, a user plane function (UPF) 105, and a data network (106). The UE 101 and the BS 102 can be a part of a radio access network (RAN) 110 (e.g., 5G-AN). The AMF 103, PCF 104, UPF 105, and DN 106 can be a part of a core network (CN) 120 (e.g., 5G-CN). The UE 101 can be a smart phone, a wearable device, an Internet of Things (IoT) device, a tablet, and the like. The BS 102 can be a 5G gNB, 4G LTE eNB, and the like.

In access stratum (AS) layer, the RAN 190 can provide radio access for the UE 101 via a radio access technology (RAT) 130, such as Bluetooth, Wi-Fi, GSM, UMTS, LTE, or 5G NR. In non-access stratum (NAS) layer, the AMF 103 can communicate with the BS 102 or the RAN 190 via a NG2 reference point (or interface) 140 for access and mobility management of wireless access devices in the wireless communication network 100. The PCF 104 can provide access and mobility management related policies to the AMF 103 via a NG15 reference point 150. The UPF 105 can communicate with the BS 102 or the RAN 190 via a NG3 reference point 160. The DN 106 can communicate with the UPF 105 via a NG6 reference point 170.

In the wireless communication network 100 (e.g., 5G NR network), a data traffic can be delivered in internet protocol (IP) packets, such as a protocol data unit (PDU) session. The PDU session defines an association between the UE 101 and the DN 106 that provides a PDU connectivity service. The PDU connectivity service provides exchange of PDUs between the UE 101 and the DN 106. Each PDU session can include a PDU session ID and one or more quality of service (QoS) flows and QoS rules.

According to aspects of the disclosure, when the UE 101 triggers an application, an outgoing traffic associated with the application can be determined according to a UE route selection policy (URSP) entity. The URSP entity can be delivered from the PCF 104 to the UE 101 and handled by a URSP handling layer 111. As a control plane layer, the URSP handling layer 111 performs interaction between upper layers (e.g., application layer 110) and lower layers (e.g., NAS layer 112) in the UE 101. According to the URSP entity, the outgoing traffic can be routed to an established PDU session, can be offloaded to a non-3GPP access outside a PDU session, or can trigger an establishment of a new PDU session.

The URSP entity can include one or more URSP rules. Each URSP rule can include a rule precedence value, a traffic descriptor, and one or more route selection descriptors (RSDs). Table 1 lists an exemplary structure of a URSP rule in the URSP entity.

In Table 1, the rule precedence value of the URSP rule identifies a precedence of the URSP rule among all the existing URSP rules in the URSP entity. The rule precedence value of the URSP rule is different from a rule precedence value of any other URSP rule within the URSP entity. The rule precedence values of the one or more URSP rules within the URSP entity can determine an order in which the one or more URSP rules are enforced in the UE 101. In an example, a URSP rule with a smallest rule precedence value is first enforced.

TABLE 1

| Information name | Description | Category | PGP permitted to modify in a UE context | Scope |
| --- | --- | --- | --- | --- |
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2) | Optional | Yes | UE context |

TABLE 1-continued

| Information name | Description | Category | PGP permitted to modify in a UE context | Scope |
|---|---|---|---|---|
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in Table 2. | Mandatory | | |

(NOTE 1)
Rules in a URSP shall have different precedence values.
(NOTE 2)
The information is used to identify the Application(s) that is(are) running on the UE's OS. The OSId does not include an OS version number. The OSAppId does not include a version number for the application.
(NOTE 3)
At least one of the Traffic descriptor components shall be present.
(NOTE 4)
The format, and some values of Connection Capabilities, e.g. "ims", "mms", "internet", etc., are defined in 3GPP Spec TS 24.526. More than one connection capabilities value can be provided.
(NOTE 5)
A URSP rule cannot contain the combination of the Traffic descriptor components IP descriptors and Non-IP descriptors.

The traffic descriptor of the URSP in Table 1 specifies a matching criteria and can include either (1) a match-all traffic descriptor or (2) at least one of the following components: (A) one or more application identifiers; (B) one or more IP 3 tuples, i.e., the destination IP address, the destination port number, and the protocol in use above the IP; (C) one or more non-IP descriptors, i.e., destination information of non-IP traffic; (D) one or more data network names (DNNs); (E) one or more connection capabilities; and (F) one or more domain descriptors, i.e., destination fully qualified domain names (FQDNs).

It is noted that, if a traffic descriptor lists one or more application identifiers together with one or more connection capabilities, the UE 101 may consider that the application identifiers identify the applications requesting access to the connection capabilities.

Each of the one or more RSDs of the URSP rule in Table 1 includes a precedence value and one or more of the following components: (A) session and service continuity (SSC) mode; (B) one or more single network slice selection assistance information (S-NSSAIs); (C) one or more DNNs; (D) one PDU session type; (E) one non-seamless non-3GPP offload indication; (F) one preferred access type; (G) one route selection validation criteria; (H) one time window; and (I) one location criteria. Table 2 lists an exemplary structure of a RSD of a URSP in the URSP entity.

In Table 2, a precedence value of one RSD is different from a precedence value of any other RSD within the URSP rule. The precedence values of the one or more RSDs within the URSP rule can determine an order in which the one or more RSDs are enforced in the UE 101. In an example, a RSD with a smallest precedence value is first enforced.

It is noted that when the non-seamless non-3GPP offload indication is present in a RSD, no other components can be included in the RSD. In addition, if one or more DNNs are included in the traffic descriptor, the one or more RSDs of the URSP rule may not include any DNN.

It is noted that only one URSP rule in the URSP entity can be a default URSP rule. The default URSP rule can contain a "match all" traffic descriptor. If the default URSP rule and the one or more non-default URSP rules are included in the URSP entity, any non-default URSP rule may have a higher priority than the default URSP rule. In an example, if a higher priority corresponds to a lower precedence value, any non-default URSP rule may have a lower precedence value than the default URSP rule.

The URSP entity may be pre-configured with or signaled to the UE 101 by a home public land mobile network (HPLMN). The pre-configured URSP and the signaled URSP can be stored in a non-volatile memory in a mobile equipment (ME) together with a subscription permanent identifier (SUPI) from a universal subscriber identity module (USIM).

TABLE 2

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |

TABLE 2-continued

| Information name | Description | Category | PCF permitted to modify in URSP | Scope |
| --- | --- | --- | --- | --- |
| Route selection components | This part defines the route selection components | Mandatory (NOTE 2) | | |
| SSC Mode Selection | One single value of SSC mode. | Optional (NOTE 5) | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

(NOTE 1)
Every Route Selection Descriptor in the list shall have a different precedence value.
(NOTE 2)
At least one of the route selection components shall be present.
(NOTE 3)
When the Subscription Information contains only one S-NSSAI in UDR, the PCF needs not provision the UE with S-NSSAI in the Network Slice Selection information. The "match all" URSP rule has one S-NSSAI at most.
(NOTE 4)
If this indication is present in a Route Selection Descriptor, no other components shall be included in the Route Selection Descriptor.
(NOTE 5)
The SSC Mode 3 shall only be used when the PDU Session Type is IP.
(NOTE 6)
The Route Selection Descriptor is not considered valid unless all the provided Validation Criteria are met.
(NOTE 7)
In this Release of specification, inclusion of the Validation Criteria in Roaming scenarios is not considered.
(NOTE 8)
When the PDU Session Type is "Ethernet" or "Unstructured", this component shall be present.

In an embodiment, if the UE 101 has both pre-configured URSP entity and signaled URSP entity, the UE 101 can only use the signaled URSP entity. The pre-configured URSP entity can be stored until a new URSP entity is configured by the HPLMN or the USIM is removed. The signaled URSP entity may be modified and can be stored until the USIM is removed. A URSP entity can only be used if the SUPI from the USIM matches the SUPI stored in the non-volatile memory of the ME. If the SUPI from the USIM does not match the SUPI stored in the non-volatile memory of the ME, the UE can delete the URSP entity.

Figure 2:
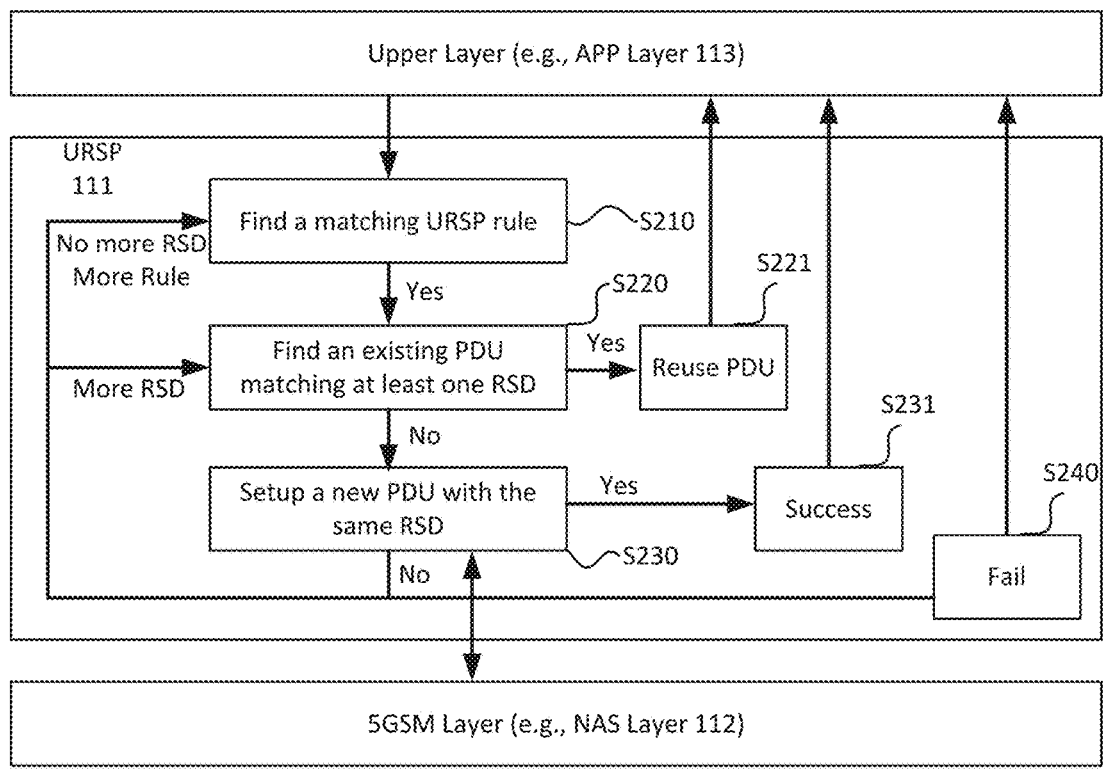
FIG. 2 shows an exemplary user equipment route selection policy (URSP) matching process according to an embodiment of the disclosure.

FIG. 2 shows an exemplary URSP matching process according to an embodiment of the disclosure. In the FIG. 2 example, when UE 101 triggers an application (e.g., a browser or an email client), an upper layer of the UE 101, such as the application layer 110, can trigger a URSP rule matching process.

At step S210, the UE 101 can attempt to find a matching URSP rule by evaluating the one or more non-default URSP rules in the URSP entity, for example, in an increasing order of the rule precedence values of the one or more non-default URSP rules. The matching URSP rule can include a traffic descriptor matching application information of the triggered application. For example, an application identifier included in the traffic descriptor matches with an application ID of the triggered application. It is noted that if the traffic descriptor includes more than one component, all of the components need to be matched with the application information. If the UE 101 finds the matching URSP rule, the matching process proceeds to step S220.

At step S220, the UE 101 can attempt to find one or more existing PDU sessions that match at least one RSD of the matching URSP rule. If the UE 101 succeeds to find an existing PDU session matching at least one RSD, the UE 101 can reuse the existing PDU session and provide information on the existing PDU to the upper layer, as shown at step S221. In an example, the information on the PDU matching a RSD having a lowest precedence value can be provided to the upper layer. If the UE 101 fails to find an existing PDU session matching at least one RSD, the process proceeds to step S230.

At S230, the 5G session management (5GSM) layer (e.g., the NAS layer 112) of the UE 101 can attempt to setup a new PDU with the same RSD. If the establishment of the new PDU session is successful, then the UE 101 can provide information (e.g., PDU address) on the new PDU to the upper layer, as shown at step S231. Specifically, the 5GSM layer indicates the attributes of the new PDU session (e.g., PDU session ID, SSC mode, S-NSSAI, DNN, PDU session type, access type, PDU address, and the like) to the URSP handling layer 111, and provide the information (e.g., PDU address) of the new PDU session to the upper layer.

However, if the establishment of the new PDU session fails and there is another unevaluated RSD, the process can attempt to evaluate the unevaluated RSD and goes back to step S220. In an example, the unevaluated RSD may have a next smallest precedence value. Then the UE 101 may repeat the steps S220/S221 to reuse an existing PDU or the steps S230/S231 to establish a new PDU.

If all RSDs of the matching URSP rule have been evaluated, then the UE 101 goes back to step S210 in order to evaluate a next non-default and unevaluated URSP that has a traffic descriptor matching the application information of the triggered application. In an example, the next matching URSP rule may have a next smallest precedence value. Then the UE 101 may repeat the steps S220/S221 to reuse an existing PDU or the steps S230/S231 to establish a new PDU.

If all non-default URSP rules have been evaluated and no non-default matching URSP rule can be found, the UE 101 informs the upper layer of a failure, as shown at step S240. In an example, if no non-default matching URSP rule can be found, the UE 101 can attempt to evaluate the default URSP rule that includes a "match all" traffic descriptor.

In an embodiment, if no non-default matching URSP rule can be found, the UE 101 can check whether a local configuration for the triggered application is available. If the location configuration for the trigger application is available, the UE 101 can perform an association of the application to an existing PDU session accordingly. If no matching PDU session exists, the 5GSM layer can attempt to establish a new PDU session based on the local configuration. If the establishment of the new PDU session is successful, the 5GSM layer can provide information on the new PDU session to the upper layer. Otherwise, if no non-default matching URSP rule can be found and if either the local configuration for the application is not available or the establishment of the new PDU session based on the local configuration for the application fails, the UE 101 can perform the association of the application to a PDU session or to a non-seamless non-3GPP offload access according to the default URSP rule with the "match-all" traffic descriptor. If the association is unsuccessful, the UE 101 informs the upper layer of a failure.

Regarding the URSP rules selection, the UE 101 can find a traffic descriptor in a non-default URSP rule matching the application information of the triggered application. However, in some cases, the UE 101 may not support the SSC mode and/or the S-NSSAI indicated in the RSD.

The support for SSC mode in 5G system architecture enables to address the various continuity requirements of different applications/services for the UE. 5G system (5GS) supports different SSC modes, such as SSC mode 1, SSC mode 2, and SSC mode 3. In the SSC mode 1, the network preserves the connectivity service provided to the UE. In the SSC mode 2, the network may release the corresponding PDU session. In the SSC mode 3, changes to the user plane can be visible to the UE, while the network ensures that the UE suffers no loss of connectivity. A connection through new PDU session anchor point is established before the previous connection is terminated in order to allow for better service continuity.

An S-NSSAI identifies a network slice. An S-NSSAI is comprised of a slice/service type (SST) and a slice differentiator (SD)). The SST refers to the expected network slice behavior in terms of features and services. The SD is optional information that complements the SST(s) to differentiate amongst multiple network slices of the same SST. NSSAI is a list of one or more S-NSSAIs. The S-NSSAI used for the PDU session establishment must be included in the allowed NSSAI. If the S-NSSAI of an established PDU session is not in the (updated) allowed NSSAI, the UE can locally release the PDU session.

Aspects of the disclosure provide various methods and apparatuses for enhancing URSP rules selection when the SSC mode and/or the S-NSSAI is not supported by a UE (e.g., the UE 101).

Figure 3:
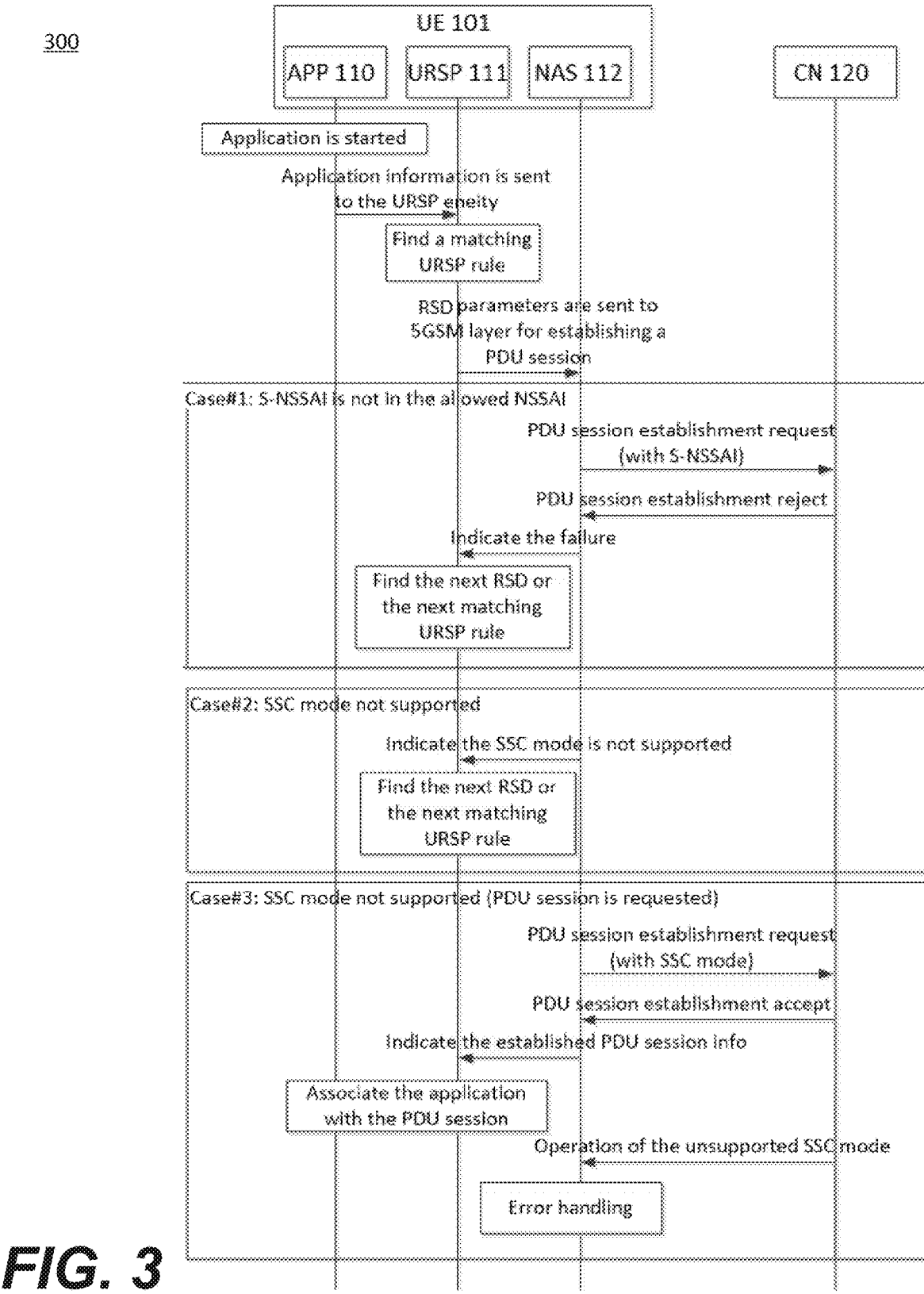
FIG. 3 shows an exemplary procedure supporting the enhanced URSP rules selection according to an embodiment of the disclosure.

FIG. 3 shows an exemplary procedure 300 supporting the enhanced URSP rules selection according to an embodiment of the disclosure. In the FIG. 3 example, the application layer 110 of the UE 101 starts an application and sends application information to the UR SP handling layer 111. In the URSP handling layer 111, the UE 101 attempts to find a matching URSP rule in the URSP entity by matching a traffic descriptor of the URSP rule with the application information of the application. If the UE 101 finds the matching URSP rule, RSD parameters of the matching URSP rule can be sent from the URSP handling layer 111 to the NAS layer 112 for establishing a PDU session.

In an embodiment (e.g., case #1), the RSD component of the matching URSP rule includes one S-NSSAI that is not in the allowed NSSAI, i.e., the S-NSSAI is an unsupported or a disallowed S-NSSAI. In such a case, the NAS layer 112 can send a PDU session establishment request message with the S-NSSAI to the CN 120. Then the CN 120 can send back a PDU session establishment reject message to the NAS layer 112, which further indicates a failure of the PDU session establishment to the URSP handling layer 111. Then the UE 101 may find a next RSD of the matching URSP rule, or a next matching URSP rule in the URSP handling layer 111.

In an embodiment (e.g., case #2), the RSD component of the matching URSP rule includes one SSC mode that is not supported, i.e., the SSC mode is an unsupported SSC mode. In such a case, the NAS layer 112 can indicate to the URSP handling layer 111 that the SSC mode is not supported by the UE 101. Then the UE 101 may find a next RSD of the matching URSP rule, or a next matching URSP rule in the URSP handling layer 111.

In an embodiment (e.g., case #3), the RSD component of the matching URSP rule includes one SSC mode that is not supported, but an associated PDU session is requested. In such a case, the NAS layer 112 can send a PDU session establishment request message with the SSC mode to the CN 120. Then the CN 120 can send back a PDU session establishment accept message to the NAS layer 112, which further indicates the information on the established PDU session to the URSP handling layer 111. The URSP handling layer 111 can provide the information on the established PDU session to the application layer 110 for associating the application with the established PDU session. However, since the SSC mode is unsupported, the CN 120 can inform the NAS layer 120 of an unsupported SSC mode operation, and the NAS layer 120 may handle the error.

Figure 4:
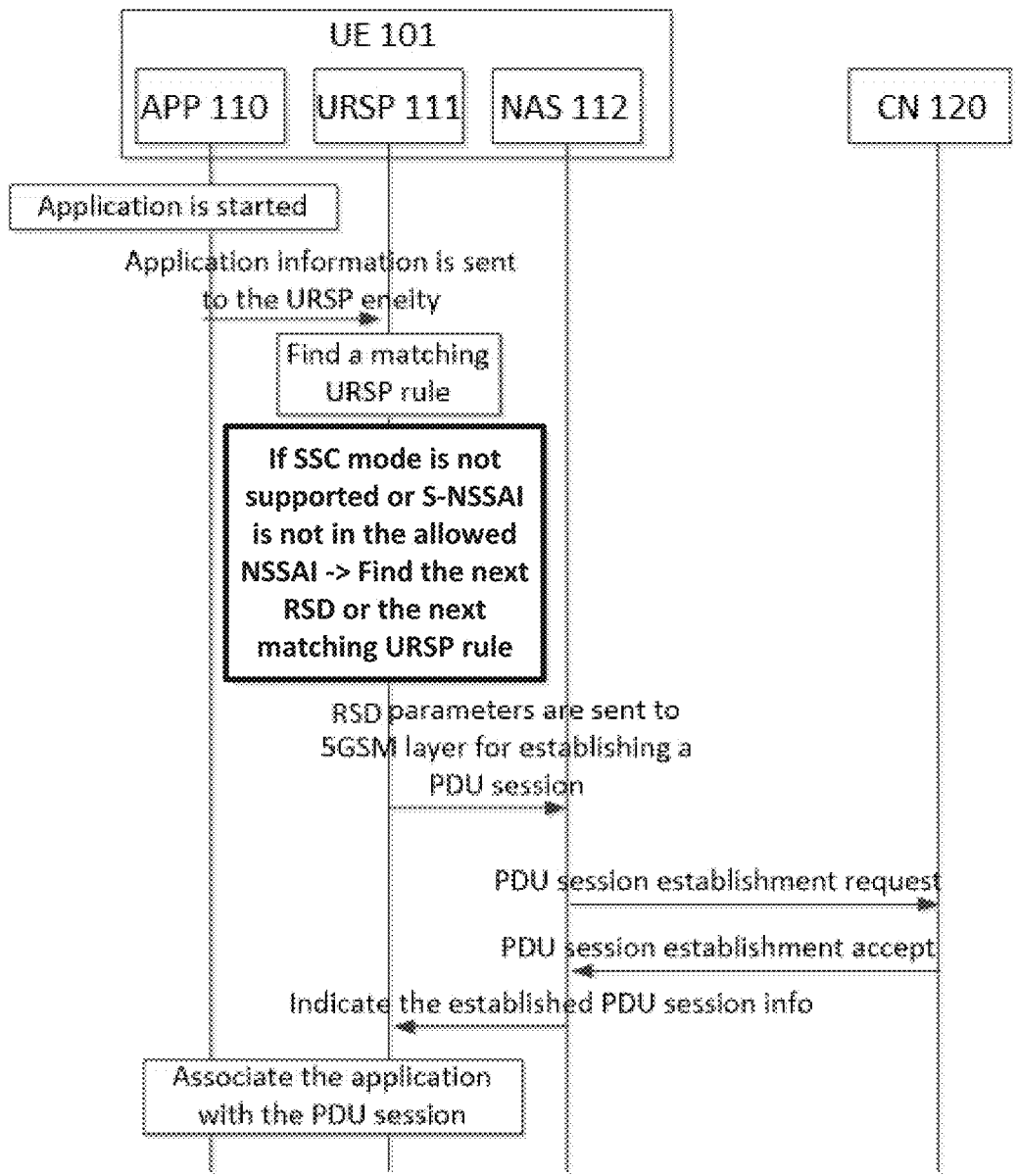
FIG. 4 shows another exemplary procedure supporting the enhanced URSP rules selection according to an embodiment of the disclosure.

FIG. 4 shows another exemplary procedure 400 supporting the enhanced URSP rules selection according to an embodiment of the disclosure. In the FIG. 4 example, the application layer 110 of the UE 101 starts an application and sends application information to the URSP handling layer 111. In the URSP handling layer 111, the UE 101 can find a matching URSP rule having a traffic descriptor matching the application information of the application according to the URSP entity. If the RSD component of the matching URSP rule includes one SSC mode that is not supported and/or S-NSSAI that is not in the allowed NSSAI, the UE 101 can find a next RSD of the matching URSP rule, or a next matching URSP rule. Once the UE 101 finds a matching URSP rule that doesn't include one unsupported SSC mode or one unsupported S-NSSAI, the RSD parameters of the matching URSP rule can be sent to the NAS layer 112 for establishing a PDU session. The NAS layer 112 can send a PDU session establishment request message to the CN 120. Then the CN 120 can send back a PDU session establishment accept message to the NAS layer 112, which further indicates the information on the established PDU session to the URSP handling layer 111. The URSP handling layer 111 can provide the information on the established PDU session to the application layer 110 for associating the application with the established PDU session.

Figure 5:
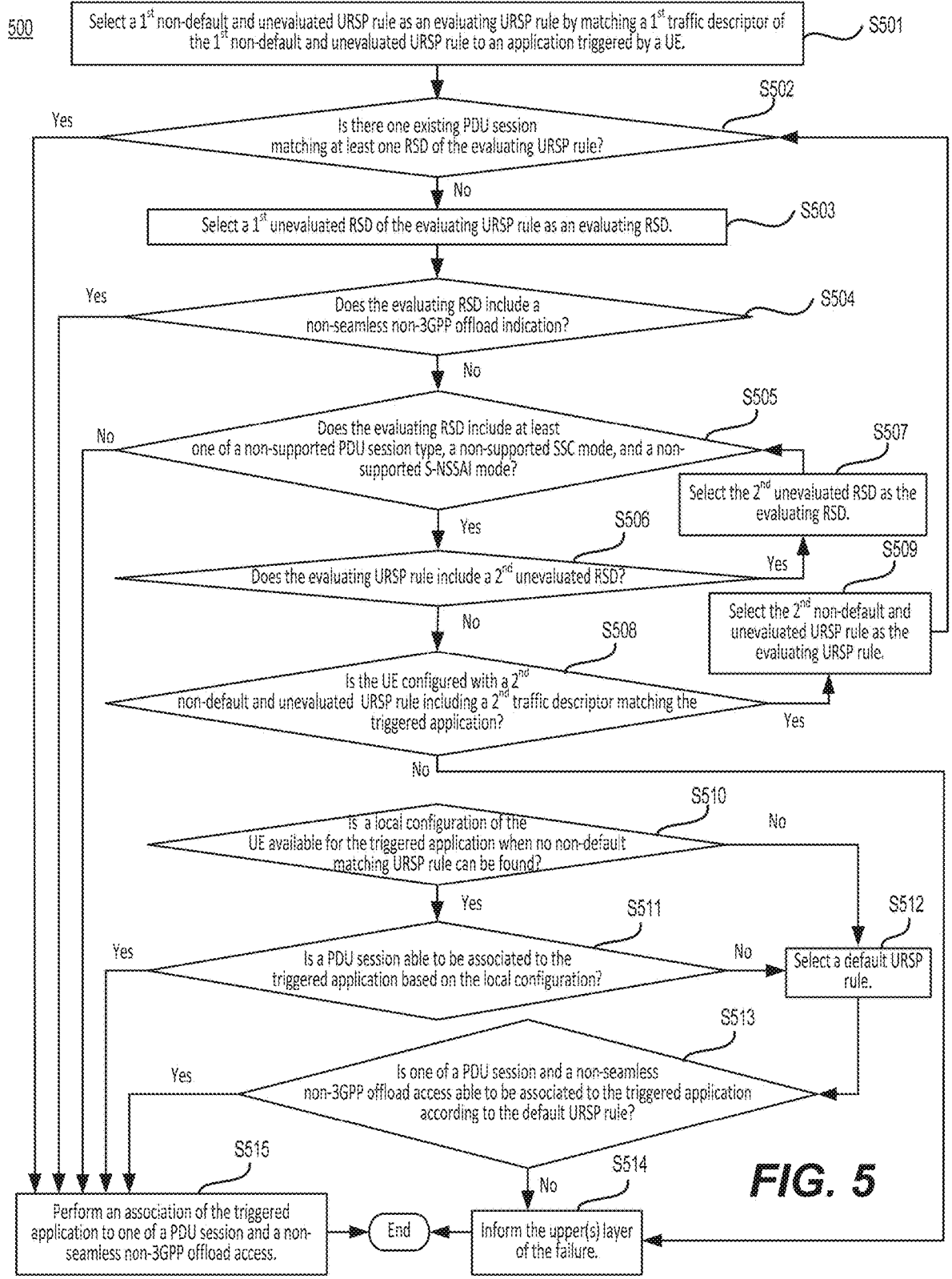
FIG. 5 shows a flowchart outlining an exemplary process according to embodiments of the disclosure.

FIG. 5 shows a flowchart outlining an exemplary process 500 according to embodiments of the disclosure. In various embodiments, the process 500 is executed by processing circuitry, such as processing circuitry in the UE 101. In some embodiments, the process 500 is implemented in software instructions, thus when the processing circuitry executes the software instructions, the processing circuitry performs the process 500.

The process 500 may generally start at step S501, where the process 500 select a first non-default and unevaluated URSP rule as an evaluating URSP rule by matching a first traffic descriptor of the first non-default and unevaluated URSP rule to application information of an application that is triggered by a UE (e.g., the UE 101). Then the process 500 proceeds to step S502.

At step S502, the process 500 determines whether there is one existing PDU session matching at least one RSD of the evaluating URSP rule. If it is determined there is one existing PDU session matching at least one RSD of the evaluating URSP rule, the process 500 proceeds to step S515. Otherwise, the process 500 proceeds to step S503.

At step S503, the process 500 selects a first unevaluated RSD of the evaluating URSP rule as an evaluating RSD. Then the process 500 proceeds to step S504.

At step S504, the process 500 determines whether the evaluating RSD includes a non-seamless non-3GPP offload indication. When the evaluating RSD is determined to include the non-seamless non-3GPP offload indication, the process 500 proceeds to step S515. Otherwise, the process 500 proceeds to step S505.

At step S505, the process 500 determines whether the evaluating RSD includes at least one of a non-supported PDU session type, a non-supported SSC mode, and a non-supported S-NSSAI. When the evaluating RSD is determined to include at least one of the non-supported PDU session type, the non-supported SSC mode, and the non-supported S-NSSAI, the process 500 proceeds to step S506. Otherwise, the process 500 proceeds to step S515.

At step S506, the process 500 determines whether the evaluating URSP rule includes a second unevaluated RSD. When the evaluating URSP rule is determined to include the second unevaluated RSD, the process 500 proceeds to step S507. Otherwise, the process 500 proceeds to step S508.

At step S507, the process 500 selects the second unevaluated RSD as the evaluating RSD. Then the process 500 proceeds to step S505.

At step S508, the process 500 determines whether the UE is configured with a second non-default and unevaluated URSP rule including a second traffic descriptor matching the triggered application. When the UE is determined to be configured with the second non-default and unevaluated URSP rule including the second traffic descriptor matching the application information of the triggered application, the process 500 proceeds to step S509. Otherwise, when all non-default matching URSP rules have been evaluated and no non-default matching URSP rule can be found, the process 500 may inform the upper layer(s) of a failure of an association of the triggered application to one of a PDU session and a non-seamless non-3GPP offload access, as shown at step S514.

At step S509, the process 500 selects the second non-default and unevaluated URSP rule as the evaluating URSP rule. Then the process 500 proceeds to step S502.

At step S510, when all non-default matching URSP rules have been evaluated and no non-default matching URSP rule can be found, the process 500 determines whether a local configuration of the UE is available for the triggered application. When it is determined that the local configuration of the UE is available for the triggered application, the process 500 proceeds to step S511. Otherwise, when it is determined that the local configuration of the UE is not available for the triggered application, the process 500 proceeds to step S512.

At step S511, the process 500 determines whether a PDU session is able to be associated to the triggered application based on the local configuration. If no matching PDU session exists, the process 500 can attempt to establish a PDU session using the UE local configuration. If the PDU session is determined to be able to be associated to the triggered application, the process 500 proceeds to step S515. Otherwise, the process proceeds to step S512.

At step S512, either the UE local configuration for the triggered application is not available or the PDU session establishment based on the UE local configuration for the triggered application is unsuccessful, thus the process 500 selects a default URSP rule including a "match all" traffic descriptor. Then the process 500 proceeds to step S513.

At step S513, the process 500 determines whether one of a PDU session and a non-seamless non-3GPP offload access is able to be associated to the triggered application according to the default URSP rule. If one of the PDU session and the non-seamless non-3GPP offload access is able to be associated to the triggered application, the process 500 proceeds to step S515. Otherwise, when the association is unsuccessful, the process 500 proceeds to step S514.

At step S514, the process 500 informs the upper layer(s) of the failure of the association of the triggered application to one of a PDU session and a non-seamless non-3GPP offload access and then terminates.

At step S515, the process 500 performs an association of the triggered application to one of a PDU session and a non-seamless non-3GPP offload access. The PDU session can be either an existing PDU session or a newly established PDU session. In an example, if the PDU session establishment is successful, the process 500 may provide information (e.g. PDU address) of the successfully established PDU session to the upper layer(s). Then the process 500 terminates.

In an embodiment, the first non-default and unevaluated URSP rule is selected based on a URSP rule precedence value of the first non-default and unevaluated URSP rule.

In an embodiment, the first unevaluated RSD is selected based on a RSD precedence value of the first unevaluated RSD.

According to aspects of the disclosure, the process 500 determines whether the evaluating RSD includes a non-seamless non-3GPP offload indication at step S504.

In an embodiment, when the evaluating RSD is determined to include the non-seamless non-3GPP offload indication, the process 500 determines whether information on a non-3GPP access outside of a PDU session is available. When the information on the non-3GPP access outside the PDU session is available, the process 500 provides the information to the upper layers (e.g., the NAS layer 112) and then proceeds to step S515 to perform the association of the application to the non-3GPP access. When the information on the non-3GPP access outside the PDU session is not available, or the non-3GPP access is not available, the process 500 proceeds to step S506 to evaluate the second unevaluated RSD and/or step S508 to evaluate the second non-default and unevaluated URSP rule if applicable.

In an embodiment, when the evaluating RSD is determined not to include the non-seamless non-3GPP offload indication, the process 500 establishes a new PDU session providing at least one of the following PDU session attributes: (A) SSC mode if there is one SSC mode in the RSD; (B) one S-NSSAI if the S-NSSAI in the RSD is in the allowed NSSAI; (C) one DNN if the DNN in the RSD is a local area data network (LADN) DNN and the UE is in a service area of the LADN; (D)PDU session type if the PDU session type is in the RSD; and (E) preferred access type if the preferred access type is in the RSD. In an example, the SSC mode 3 is only used when the PDU session type is IPv4, IPv6, or IPv4v6. In an example, if the S-NSSAI in the RSD is not in the allowed NSSAI, the S-NSSAI is not used as a PDU session attribute for establishing a PDU session. In an example, if there are multiple S-NSSAIs in the RSI), an S-NSSAI is chosen among the S-NSSAIs based on UE implementation. In an example, if one or more DNNs are included in the traffic descriptor of a URSP rule, the existing DNNs in the RSD for the application are ignored. In an example, if there is no DNN in the traffic descriptor and there are multiple DNNs in the RSD, a DNN is chosen based on UE implementation.

According to aspects of the disclosure, the NAS layer 112 of the UE 101 indicates a result of the PDU session establishment. Upon successful completion of the PDU session establishment, the NAS layer 112 can additionally indicate the attributes of the established PDU session (e.g. PDU session identity, SSC mode, S-NSSAI, DNN, PDU session type, access type, PM address, and the like) to the URSP handling layer 111, and provide information (e.g. PDU address) of the successfully established. PDU session to the upper layers (e.g., the application layer 110). Then the process 500 can terminate. If the PM session establishment is unsuccessful, the process 500 proceeds to step S506 to evaluate the second unevaluated RSD and/or step S508 to evaluate the second non-default and unevaluated URSP rule if applicable.

According to aspects of the disclosure, the NAS layer 112 of the UE 101 can attempt to establish a PDU session using UE local configuration. Any missing information in the UE local configuration needed to build the PDU session establishment request can be the appropriate corresponding component from the default URSP rule with the "match-all" traffic descriptor. If the PDU session establishment is successful, the NAS layer 112 can provide information (e.g. PDU address) of the successfully established PDU session to the upper layers (e.g., the application layer 110). Then the process 500 can terminate. Otherwise, the process 500 proceeds to step S512 to evaluate the default URSP rule.

According to aspects of the disclosure, the UE 101 may re-evaluate the URSP rules and change the association of an application to a PDU session when at least one of the following conditions is satisfied: (a) the UE 101 performs periodic URSP rules re-evaluation based on UE implementation; (b) the NAS layer 112 indicates that an existing PDU session used for routing traffic of an application based on a URSP rule is released; (c) the URSP entity is updated by the PCF 104; (d) the NAS layer 112 indicates that the UE 101 performs inter-system change from S1 mode to N1 mode; (e) the NAS layer 112 indicates that the UE is successfully registered in N1 mode over 3GPP access or non-3GPP access; (f) the UE 101 establishes or releases a connection to a WLAN access and transmission of a PDU of the application via non-3GPP access outside of a PDU session becomes available/unavailable; (g) the allowed NSSAI is changed; or (h) the LADN information is changed. The time when the UE 101 performs the re-evaluation is up to UE implementation. The URSP handling layer 111 may request the NAS layer 112 to release an existing PDU session after the re-evaluation.

According to aspects of the disclosure, if no non-default matching URSP rule can be found and if either UE local configuration for the application is not available or the PDU session establishment based on UE local configuration for the application was unsuccessful, the UE shall perform the association of the application to a PDU session or to non-seamless non-3GPP offload according to the default URSP rule with the "match-all" traffic descriptor, if any. If the association is unsuccessful, the UE shall inform the upper layers of the failure.

According to aspects of the disclosure, when the evaluating URSP rule is determined not to include the second unevaluated RSD, the process 500 determines whether the UE is configured with the second non-default and unevaluated URSP rule that includes the second traffic descriptor matching the application information of the triggered application.

In an embodiment, when the UE is determined to be configured with the second non-default and unevaluated URSP rule that includes the second traffic descriptor matching the application information of the triggered application, the process 500 selects the second non-default and unevaluated URSP rule as the evaluating URSP rule.

In an embodiment, when the UE is determined not to be configured with the second non-default and unevaluated URSP rule that includes the second traffic descriptor matching the application information of the triggered application, the process 500 determines whether the local configuration of the UE is available for the triggered application. When the local configuration of the UE is determined to be available for the triggered application, the process 500 performs an association of the triggered application to a PDU session based on the local configuration of the UE. When the local configuration of the UE is determined not to be available for the triggered application, the process 500 selects the default URSP rule including the "match all" traffic descriptor.

In an embodiment, the process 500 establishes a new PDU session when the evaluating RSD is determined not to include at least one of the non-supported PDU session type, the non-supported SSC mode, and the non-supported S-NSSAI.

In an embodiment, the process 500 performs an association of the triggered application to one of a PDU session and a non-seamless non-3GPP offload access. When the association is not successful, the process 500 reports a failure of the association.

Figure 6:
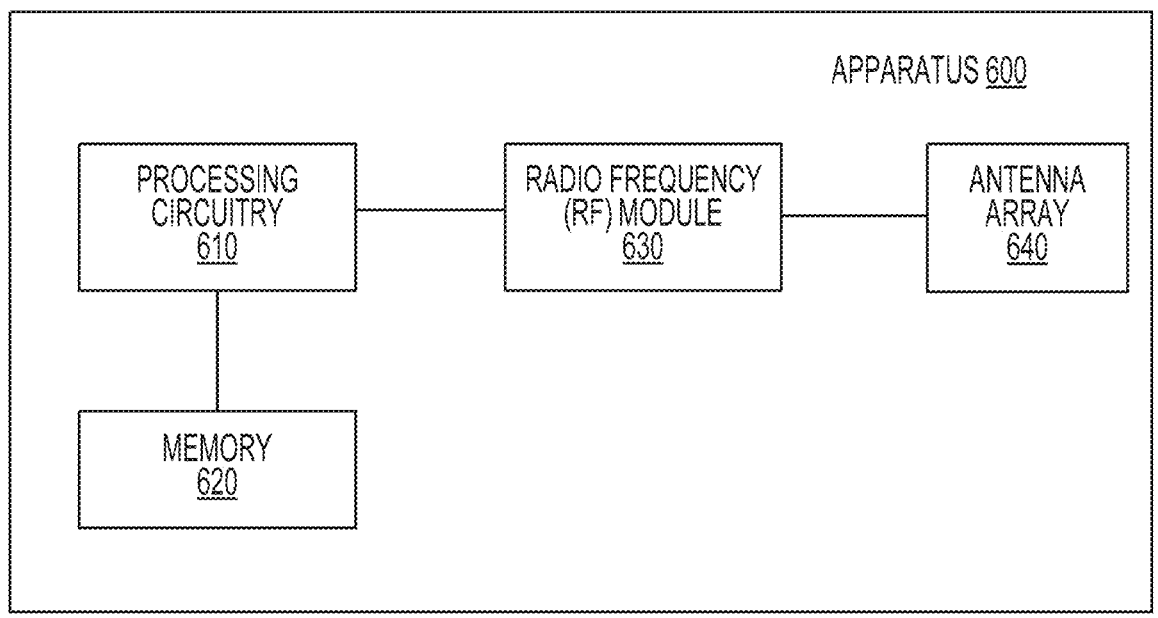
FIG. 6 shows an exemplary apparatus according to embodiments of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of techniques, processes, functions, components, and systems described herein. For example, the apparatus 600 can be used to implement functions of the BS 103 in various embodiments and examples described herein. The apparatus 600 can include a general purpose processor or specially designed circuits to implement various functions, components, or processes described herein in various embodiments. The apparatus 600 can include processing circuitry 610, a memory 620, a radio frequency (RF) module 630, and an antenna array 640.

In various examples, the processing circuitry 610 can include circuitry configured to perform the functions and processes described herein in combination with software or without software. In various examples, the processing circuitry 610 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include a read only memory (ROM), a random access memory (RAM), a flash memory, a solid state memory, a hard disk drive, an optical disk drive, and the like.

The RF module 630 receives a processed data signal from the processing circuitry 610 and converts the data signal to a wireless signal that is then transmitted via the antenna array 640, or vice versa. The RF module 630 can include a digital to analog convertor (DAC), an analog to digital converter (ADC), a frequency up convertor, a frequency down converter, filters and amplifiers for reception and transmission operations. The RF module 630 can include multi-antenna circuitry for beamforming operations. For example, the multi-antenna circuitry can include an uplink spatial filter circuit, and a downlink spatial filter circuit for shifting analog signal phases or scaling analog signal amplitudes.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of wireless communication at a user equipment (UE) that triggers an application, the method comprising:
   selecting a first non-default and unevaluated UE route selection policy (URSP) rule as an evaluating URSP rule based on the first non-default and unevaluated URSP rule including a first traffic descriptor that matches application information of the triggered application;
   selecting a first unevaluated route selection descriptor (RSD) of the evaluating URSP rule as an evaluating RSD;
   determining whether the evaluating RSD includes at least one of a non-supported protocol data unit (PDU) session type, a non-supported session and service continuity (SSC) mode, and a non-supported single network slice selection assistance information (S-NSSAI);
   determining whether the evaluating URSP rule includes a second unevaluated RSD when the evaluating RSD is determined to include at least one of the non-supported PDU session type, the non-supported SSC mode, and the non-supported S-NSSAI; and
   selecting the second unevaluated RSD as the evaluating RSD when the evaluating URSP rule is determined to include the second unevaluated RSD.

2. The method of claim 1, further comprising:
   when the evaluating URSP rule is determined not to include the second unevaluated RSD, determining whether the UE is configured with a second non-default and unevaluated URSP rule that includes a second traffic descriptor matching the application information of the triggered application; and
selecting the second non-default and unevaluated URSP rule as the evaluating URSP rule when the UE is determined to be configured with the second non-default and unevaluated URSP rule that includes the second traffic descriptor matching the application information of the triggered application.

3. The method of claim 2, further comprising:
when the UE is determined not to be configured with the second non-default and unevaluated URSP rule that includes the second traffic descriptor matching the application information of the triggered application,
reporting a failure of an association of the triggered application to one of a PDU session and a non-seamless non-3GPP offload access when the association is not successful.

4. The method of claim 1, wherein the first non-default and unevaluated URSP rule is selected based on a URSP rule precedence value of the first non-default and unevaluated URSP rule.

5. The method of claim 1, wherein the first unevaluated RSD is selected based on a RSD precedence value of the first unevaluated RSD.

6. The method of claim 1, further comprising:
before selecting the first unevaluated RSD of the evaluating URSP rule as the evaluating RSD,
determining whether the UE is configured with an existing PDU session matching at least one RSD of the evaluating URSP rule; and
providing information on the existing PDU session when the UE is determined to be configured with the existing PDU session matching at least one RSD of the evaluating URSP rule.

7. The method of claim 6, wherein the selecting the first unevaluated RSD of the evaluating URSP rule includes selecting the first unevaluated RSD of the evaluating URSP rule when the UE is determined not to be configured with the existing PDU session matching at least one RSD of the evaluating URSP rule.

8. The method of claim 1, further comprising:
determining whether the evaluating RSD includes a non-seamless non-3GPP offload indication; and
establishing a new PDU session when the evaluating RSD is determined not to include the non-seamless non-3GPP offload indication.

9. The method of claim 1, further comprising:
establishing a new PDU session when the evaluating RSD is determined not to include at least one of the non-supported PDU session type, the non-supported SSC mode, and the non-supported S-NSSAI.

10. The method of claim 1, further comprising:
performing an association of the triggered application to one of a PDU session and a non-seamless non-3GPP offload access; and
reporting a failure of the association when the association is not successful.

11. An apparatus triggering an application and comprising processing circuitry configured to:
select a first non-default and unevaluated UE route selection policy (URSP) rule as an evaluating URSP rule based on the first non-default and unevaluated URSP rule including a first traffic descriptor that matches application information of the triggered application;
select a first unevaluated route selection descriptor (RSD) of the evaluating URSP rule as an evaluating RSD;
determine whether the evaluating RSD includes at least one of a non-supported protocol data unit (PDU) session type, a non-supported session and service continuity (SSC) mode, and a non-supported single network slice selection assistance information (S-NSSAI);
determine whether the evaluating URSP rule includes a second unevaluated RSD when the evaluating RSD is determined to include at least one of the non-supported PDU session type, the non-supported SSC mode, and the non-supported S-NSSAI; and
select the second unevaluated RSD as the evaluating RSD when the evaluating URSP rule is determined to include the second unevaluated RSD.

12. The apparatus of claim 11, wherein the processing circuitry is further configured to:
when the evaluating URSP rule is determined not to include the second unevaluated RSD,
determine whether the UE is configured with a second non-default and unevaluated URSP rule that includes a second traffic descriptor matching the application information of the triggered application; and
select the second non-default and unevaluated URSP rule as the evaluating URSP rule when the UE is determined to be configured with the second non-default and unevaluated URSP rule that includes the second traffic descriptor matching the application information of the triggered application.

13. The apparatus of claim 12, wherein the processing circuitry is further configured to:
when the UE is determined not to be configured with the second non-default and unevaluated URSP rule that includes the second traffic descriptor matching the application information of the triggered application,
report a failure of an association of the triggered application to one of a PDU session and a non-seamless non-3GPP offload access when the association is not successful.

14. The apparatus of claim 11, wherein the first non-default and unevaluated URSP rule is selected based on a URSP rule precedence value of the first non-default and unevaluated URSP rule.

15. The apparatus of claim 11, wherein the first unevaluated RSD is selected based on a RSD precedence value of the first unevaluated RSD.

16. The apparatus of claim 11, wherein the processing circuitry is further configured to:
before selecting the first unevaluated RSD of the evaluating URSP rule as the evaluating RSD,
determine whether the UE is configured with an existing PDU session matching at least one RSD of the evaluating URSP rule;
provide information on the existing PDU session when the UE is determined to be configured with the existing PDU session matching at least one RSD of the evaluating URSP rule; and
select the first unevaluated RSD of the evaluating URSP rule when the UE is determined not to be configured with the existing PDU session matching at least one RSD of the evaluating URSP rule.

17. The apparatus of claim 11, wherein the processing circuitry is further configured to:
determine whether the evaluating RSD includes a non-seamless non-3GPP offload indication; and establish a new PDU session when the evaluating RSD is determined not to include the non-seamless non-3GPP offload indication.

18. The apparatus of claim 11, wherein the processing circuitry is further configured to:
    establish a new PDU session when the evaluating RSD is determined not to include at least one of the non-supported PDU session type, the non-supported SSC mode, and the non-supported S-NSSAI.

19. The apparatus of claim 11, wherein the processing circuitry is further configured to:
    perform an association of the triggered application to one of a PDU session and a non-seamless non-3GPP offload access; and
    report a failure of the association when the association is not successful.

20. A non-transitory computer-readable storage medium storing a program executable by at least one processor to perform:
    selecting a first non-default and unevaluated UE route selection policy (URSP) rule as an evaluating URSP rule based on the first non-default and unevaluated URSP rule including a first traffic descriptor that matches application information of a triggered application;
    selecting a first unevaluated route selection descriptor (RSD) of the evaluating URSP rule as an evaluating RSD;
    determining whether the evaluating RSD includes at least one of a non-supported protocol data unit (PDU) session type, a non-supported session and service continuity (SSC) mode, and a non-supported single network slice selection assistance information (S-NSSAI);
    determining whether the evaluating URSP rule includes a second unevaluated RSD when the evaluating RSD is determined to include at least one of the non-supported PDU session type, the non-supported SSC mode, and the non-supported S-NSSAI; and
    selecting the second unevaluated RSD as the evaluating RSD when the evaluating URSP rule is determined to include the second unevaluated RSD.

\* \* \* \* \*